(12) United States Patent
Rajaraman et al.

(10) Patent No.: US 8,281,332 B2
(45) Date of Patent: Oct. 2, 2012

(54) ANIMATED VIDEO OVERLAYS

(75) Inventors: Shivakumar Rajaraman, San Francisco, CA (US); Jasson Arthur Shrock, Mountain View, CA (US)

(73) Assignee: Google Inc., Mountain View, CA (US)

( * ) Notice: Subject to any disclaimer, the term of this patent is extended or adjusted under 35 U.S.C. 154(b) by 587 days.

(21) Appl. No.: 12/111,179

(22) Filed: Apr. 28, 2008

(65) Prior Publication Data

US 2008/0276272 A1    Nov. 6, 2008

Related U.S. Application Data

(60) Provisional application No. 60/915,654, filed on May 2, 2007, provisional application No. 60/945,326, filed on Jun. 20, 2007.

(51) Int. Cl.
*H04N 7/10* (2006.01)
*G06Q 30/00* (2012.01)

(52) U.S. Cl. ......... 725/32; 725/34; 705/14.4; 705/14.68

(58) Field of Classification Search ................... 725/32, 725/34, 35
See application file for complete search history.

(56) References Cited

U.S. PATENT DOCUMENTS

| | | |
|---|---|---|
| 5,638,523 A | 6/1997 | Mullet et al. |
| 5,790,122 A | 8/1998 | Cecchini et al. |
| 5,801,747 A * | 9/1998 | Bedard ........................... 725/46 |
| 6,091,416 A | 7/2000 | Cragun |
| 6,097,390 A | 8/2000 | Marks |
| 6,282,713 B1 | 8/2001 | Kitsukawa et al. |
| 6,393,158 B1 | 5/2002 | Gould et al. |
| 6,615,270 B2 | 9/2003 | Gould et al. |
| 6,621,980 B1 | 9/2003 | Gould et al. |
| 6,698,020 B1 | 2/2004 | Zigmond et al. |

(Continued)

FOREIGN PATENT DOCUMENTS

WO    WO 2007/047645 A1    4/2007

(Continued)

OTHER PUBLICATIONS

*AJAX Activity Indicators*, Archived on Dec. 25, 2006 on www.web.archive.org [Online] [Retrieved on Jun. 10, 2008, Retrieved from the Internet <URL:http://web.archive.org/web/20061225134638/http://www/napyfab.com/ajax-indicators/>.

(Continued)

*Primary Examiner* — Brian Pendleton
*Assistant Examiner* — Fernando Alcon
(74) *Attorney, Agent, or Firm* — Fenwick & West LLP

(57) ABSTRACT

A video server provides video content to a client via a network. At the instruction of the video server, a player at the client contacts an ad server and downloads one or more creatives and a controller file to the client. The controller file indicates how the creative manifests itself in play. The player displays the video content in a display area at the client. The controller file causes the creative to appear as an animated overlay over the video content. User interface elements indicate the point in the video when the creative appears, and allow the user to minimize and replay the creative. The player can also display other creatives, such as a static creative that is associated with the animated creative. A user can select the creative to view additional information about a product advertised by the creative.

31 Claims, 8 Drawing Sheets

U.S. PATENT DOCUMENTS

| | | | |
|---|---|---|---|
| 7,043,746 B2 | 5/2006 | Ma | |
| 7,356,477 B1 * | 4/2008 | Allan et al. | 705/14.4 |
| 7,467,218 B2 | 12/2008 | Gould et al. | |
| 7,519,273 B2 * | 4/2009 | Lowthert et al. | 725/34 |
| 7,725,502 B1 * | 5/2010 | Badros et al. | 705/14.73 |
| 7,870,023 B2 * | 1/2011 | Ozer et al. | 725/32 |
| 2002/0078456 A1 | 6/2002 | Hudson et al. | |
| 2002/0087402 A1 | 7/2002 | Zustack et al. | |
| 2002/0100041 A1 * | 7/2002 | Rosenberg et al. | 725/32 |
| 2002/0109729 A1 | 8/2002 | Dutta | |
| 2003/0061305 A1 | 3/2003 | Copley et al. | |
| 2003/0083937 A1 | 5/2003 | Hasegawa et al. | |
| 2004/0117827 A1 | 6/2004 | Karaoguz et al. | |
| 2004/0133910 A1 | 7/2004 | Gordon et al. | |
| 2004/0199657 A1 | 10/2004 | Eyal et al. | |
| 2005/0028190 A1 | 2/2005 | Rodriguez et al. | |
| 2005/0034151 A1 | 2/2005 | Abramson | |
| 2005/0137958 A1 | 6/2005 | Huber et al. | |
| 2005/0267813 A1 | 12/2005 | Monday | |
| 2006/0013555 A1 | 1/2006 | Poslinski | |
| 2006/0015904 A1 | 1/2006 | Marcus | |
| 2006/0020966 A1 | 1/2006 | Poslinski | |
| 2006/0048186 A1 | 3/2006 | Alterman | |
| 2006/0053470 A1 | 3/2006 | Colter et al. | |
| 2006/0107285 A1 | 5/2006 | Medvinsky | |
| 2006/0140584 A1 | 6/2006 | Ellis et al. | |
| 2006/0179466 A1 | 8/2006 | Pearson et al. | |
| 2006/0214947 A1 | 9/2006 | Boose et al. | |
| 2006/0218577 A1 | 9/2006 | Goodman et al. | |
| 2006/0224693 A1 | 10/2006 | Gaidemak et al. | |
| 2006/0230427 A1 | 10/2006 | Kunkel et al. | |
| 2006/0259588 A1 | 11/2006 | Lerman et al. | |
| 2006/0259589 A1 | 11/2006 | Lerman et al. | |
| 2006/0271977 A1 | 11/2006 | Lerman et al. | |
| 2007/0061203 A1 * | 3/2007 | Ellis et al. | 705/14 |
| 2007/0100699 A1 | 5/2007 | Ajizadeh | |
| 2007/0107010 A1 * | 5/2007 | Jolna et al. | 725/34 |
| 2007/0130015 A1 | 6/2007 | Starr et al. | |
| 2007/0174774 A1 | 7/2007 | Lerman et al. | |
| 2007/0183741 A1 | 8/2007 | Lerman et al. | |
| 2007/0189708 A1 | 8/2007 | Lerman et al. | |
| 2007/0226053 A1 | 9/2007 | Carl et al. | |
| 2008/0021775 A1 | 1/2008 | Lerman et al. | |
| 2008/0062127 A1 | 3/2008 | Brodersen et al. | |
| 2008/0109306 A1 | 5/2008 | Maigret et al. | |
| 2008/0109844 A1 | 5/2008 | Baldeschwieler et al. | |
| 2008/0127280 A1 | 5/2008 | Kuang et al. | |
| 2008/0147500 A1 | 6/2008 | Slaney et al. | |
| 2008/0155585 A1 * | 6/2008 | Craner et al. | 725/32 |
| 2008/0250447 A1 * | 10/2008 | Rowe et al. | 725/32 |
| 2008/0270389 A1 | 10/2008 | Jones et al. | |
| 2009/0030802 A1 | 1/2009 | Plotnick et al. | |
| 2009/0138904 A1 | 5/2009 | Kitsukawa et al. | |
| 2009/0149743 A1 | 6/2009 | Barron et al. | |
| 2009/0199230 A1 | 8/2009 | Kumar et al. | |
| 2010/0198697 A1 | 8/2010 | Brown et al. | |
| 2011/0119700 A1 | 5/2011 | Hamilton | |

FOREIGN PATENT DOCUMENTS

| | | |
|---|---|---|
| WO | WO 2008/033944 | 3/2008 |

OTHER PUBLICATIONS

Delaney, Kevin J., *Start-ups seek to cash in on Web-Video Ads*, Wall Street Journal, Mar. 2, 2007, [Online] [Retrieved Sep. 3, 2008] Retrieved from the Internet <URL: http://www.scanscout.com/wsj-070302.html>.

"Ad Serving with RealSystem™ G2," RealNetworks, 1999, 38 pages, [online] [Retrieved on Feb. 13, 2009] Retrieved from the internet <URL:http://service.real.com/help/library/blueprints/adserve/adserve.htm>.

Riley, D., "Contextual In-Video Advertising: ScanScout," May 14, 2007, [online] [Retrieved on Jul. 15, 2008] Retrieved from the internet <URL://www.techcrunch.com/2007/05/14/contextual-in-video-advertising-scanscout/>.

Strange, A., "VideoEgg Exec: YouTube's New Ads Are Just Like Ours," Wired Blog Network, Aug. 22, 2007, [online] [Retrieved on Jul. 15, 2008] Retrieved from the internet <URL:http://blog.wired.com/business/2007/08/network-wars-vi.html>.

"Overlay & Video AdType," ScanScout, 2007, [online] [Retrieved on Jul. 15, 2008] Retrieved from the internet <URL://demo.scanscout.com/livedemo.shtml?adType=overlay&videoAdType=rightSide&ss . . . >.

PCT International Search Report and Written Opinion, PCT/US08/62103, Aug. 26, 2008, 9 Pages.

PCT International Search Report and Written Opinion, PCT/US08/62442, Jul. 14, 2008, 9 Pages.

"www.BrightRoll.com," 2 pages, Archived on Apr. 29, 2007 on web.archive.org [online] [Retrieved on Oct. 19, 2009] Retrieved from the internet <URL:http://web.archive.org/web/20070429110654/http://www.brightroll.com/>.

"www.Scanscout.com," 2 pages, Archived on Apr. 7, 2007 on web.archive.org [online] [Retrieved on Oct. 19, 2009] Retrieved from the internet URL:http://web.archive.org/web/20070407233129/http://www.scanscout.com/>.

"www.YuMe.com," 2009, 1 Page, [online] [Retrieved on Oct. 19, 2009] Retrieved from the internet <URL:http://www.yume.com/>.

PCT International Search Report and Written Opinion, PCT/US2008/066175, Jun. 9, 2009, 8 Pages.

"Idea: How to Put Ads into YouTube," www.adverlab.blogspot.com, Nov. 22, 2006, 1 page, [online] [retrieved on Mar. 22, 2010] Retrieved from the Internet <URL:http://adverlab.blogspot.com/2006/11/idea-how-to-put-ads-intoyoutube.html>.

Examiner's First Report on Australian Patent Application No. AU 2008247579, Mar. 19, 2012, 3 Pages.

Examiner's First Report on Australian Patent Application No. 2008247732, Jul. 13, 2011, 3 pages.

First Office Action for Chinese Patent Application No. 200880019963.9, May 6, 2011, 15 Pages.

First Office Action for Chinese Patent Application No. 200880019399.0, Apr. 25, 2011, 11 Pages.

Van Buren, S., "YouTube's external video player = seductive user interface design." A Matter of Degree, A Microsoft SharePoint/Information Architecture/Web Usability blog, Dec. 27, 2006, 2 pages, [online] [retrieved on Feb. 26, 2011] Retrieved from the Internet <URL: http://amatterofdegree.typepad.com/a_matter_of_degree/2006/12/youtubes_extern.html>.

"How to Embed Windows Media Files," MediaCollege, Nov. 24, 2005, 1 page, [online] [retrieved on Feb. 26, 2011] Retrieved from the Internet <URL:http://web.archive.org/web/20051124210305/http://www.mediacollege.com/video/format/windows-media/streaming/embed.html>.

Berg, J., "Google AdSense to Benefit YouTube," iMedia Connection, Oct. 10, 2006, 1 pages, [online] [retrieved on Mar. 22, 2010] Retrieved from the Internet <URL:http://www.imediaconnection.com/content/11634.imc>.

"Idea: How to Put Ads into YouTube," www.adverlab.blogspot.com, Nov. 22, 2006, 1 page, [online] [retrieved on Mar. 22, 2010] Retrieved from the Internet <URL:http://adverlab.blogspot.com/2006/11/idea-howto-put-ads-intoyoutube.html>.

Anonymous: "Improved Ads for YouTube 1-15 Videos—Overlay Advertising," www.vlogblog.com, Aug. 22, 2007, 1 page, [online] [retrieved on Mar. 24, 2010] Retrieved from the Internet <URL:http://www.vlogblog.com/index.php/arch ives/2007/08/22/improved-ads-for-youtube-videos-overlay-advertising/>.

Supplementary European Search Report for European Patent Application No. EP 08747251, Apr. 20, 2010, 9 pages.

Office Action of the European Patent Office for European Patent Application No. EP 08755012.5, Aug. 30, 2010, 3 pages.

Supplementary European Search Report for European Patent Application No. EP 08755012.5, Apr. 20, 2010, 9 pages.

Second Office Action for Chinese Patent Application No. CN 200880019399.0, Apr. 23, 2012, 12 pages.

Second Office Action for Chinese Patent Application No. CN 200880019963.9, Apr. 26, 2012, 6 pages.

\* cited by examiner

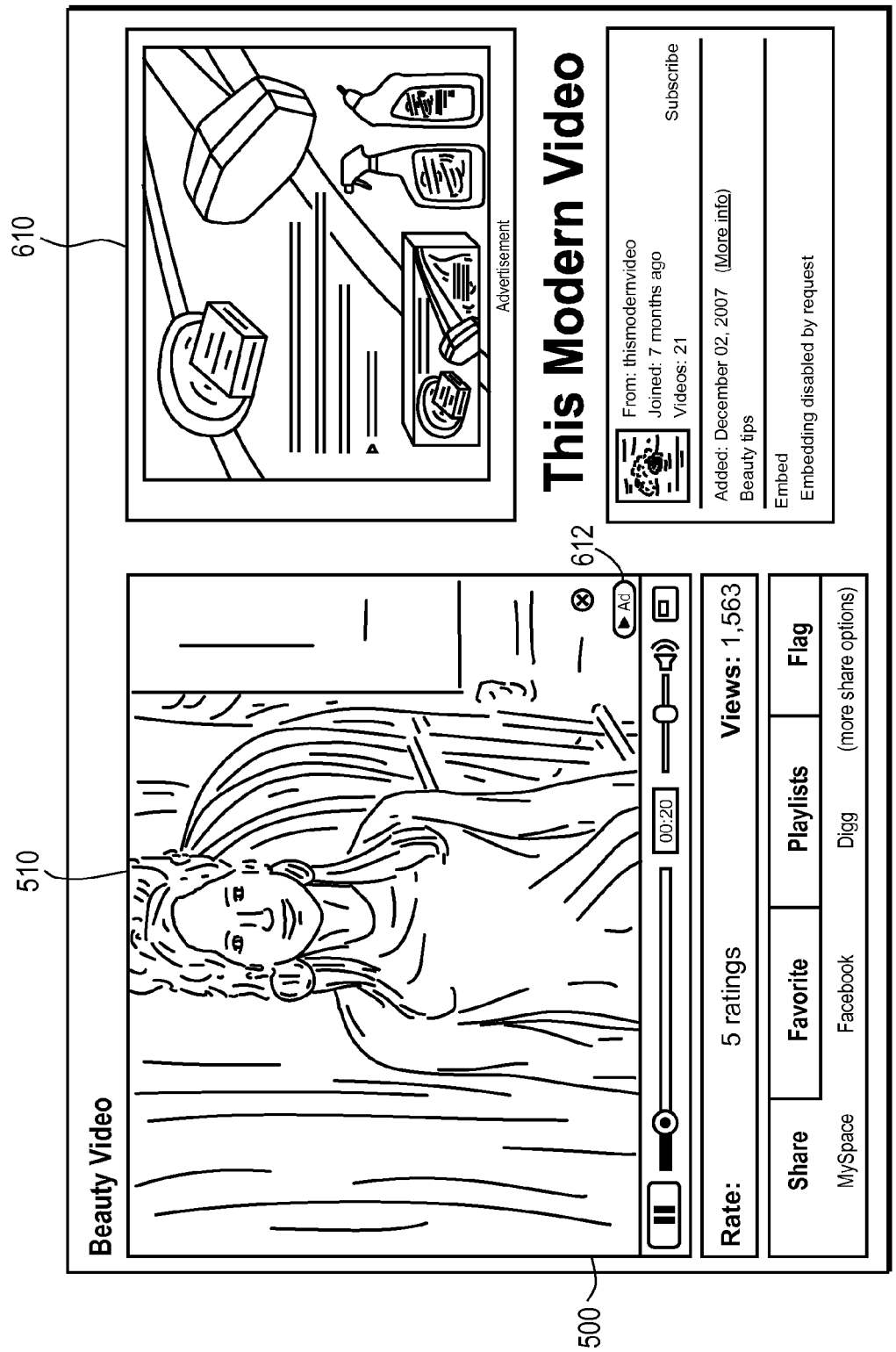

ANIMATED VIDEO OVERLAYS

CROSS-REFERENCE TO RELATED APPLICATIONS

This application claims the benefit of U.S. Provisional Application No. 60/915,654, filed May 2, 2007, and U.S. Provisional Application No. 60/945,326, filed Jun. 20, 2007, both of which are hereby incorporated herein by reference.

BACKGROUND

1. Field of the Invention

This invention pertains in general to web-based video display and specifically to managing video and advertising content in an online content distribution system.

2. Description of the Related Art

The sharing of video content on websites has developed into a worldwide phenomenon, supported by dozens of websites. On average, over 10,000 videos are posted every day, and this number is increasing as the tools and opportunities for capturing video become easy to use and more widespread. Shared video content provides opportunities to present advertising material to viewers along with the requested video content. However, some mechanisms for delivering advertising with shared video have been relatively ineffective, while others are perceived by users as being objectionable.

People who use video sharing services have a wide range of motivations for using those services. Some are interested in specific information in the shared content, while others are just browsing in a leisurely manner through the content. Advertising that appears in conjunction with the video content, in order to be effective as well as maintain a satisfactory experience for the user, needs to be presented in a manner that takes these widely varying user characteristics into account. Ideally, the advertisements are presented in a manner that minimizes user abandonment of videos in response to what is perceived as intrusive advertising.

For example, an advertisement that appears before a requested video is likely to be viewed by the user. However, such pre-roll ads can also cause the user to grow impatient while waiting for the requested video to appear and lead the user to abandon the video. Additionally, a user can easily ignore a post-roll advertisement that appears after the requested video.

There remains a need for a way to present requested video content and advertising in a manner that is both satisfying to the viewer and effective for advertisers.

SUMMARY

The above and other needs are met by displaying an animated creative (such as an advertisement) in association with the video. One embodiment of a method for displaying a creative in association with a video comprises causing the video to play in a video area of a user interface on a client, causing the creative to display in a portion of the video area, the creative overlaid on the playing video, and causing display of a companion video in response to selection of the creative by a user of the client. The companion video appears in the video area superimposed over a partial portion of the video.

Another embodiment includes a computer-readable storage medium storing computer program instructions for displaying a creative in association with a video. The computer program instructions comprise a player module configured to receive a video for displaying in a display area of a client, a creative associated with the video, and a controller file specifying how the creative manifests during display of the video. The computer program instructions further comprise a player control module configured to receive the controller file and to display the creative in a portion of the display area overlaid on the displayed video responsive at least in part to the controller file.

Another embodiment comprises displaying a progress bar illustrating a length of the video being played and a current playback position of the video and displaying an indicator on the progress bar indicating a playback position of the video at which a creative is displayed. The creative is displayed as an overlay superimposed over the video.

BRIEF DESCRIPTION OF THE DRAWINGS

FIGS. 6A, 6B, and 6C illustrate a partial web page including the UI generated by the player and other elements at different stages of operation according to one embodiment.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
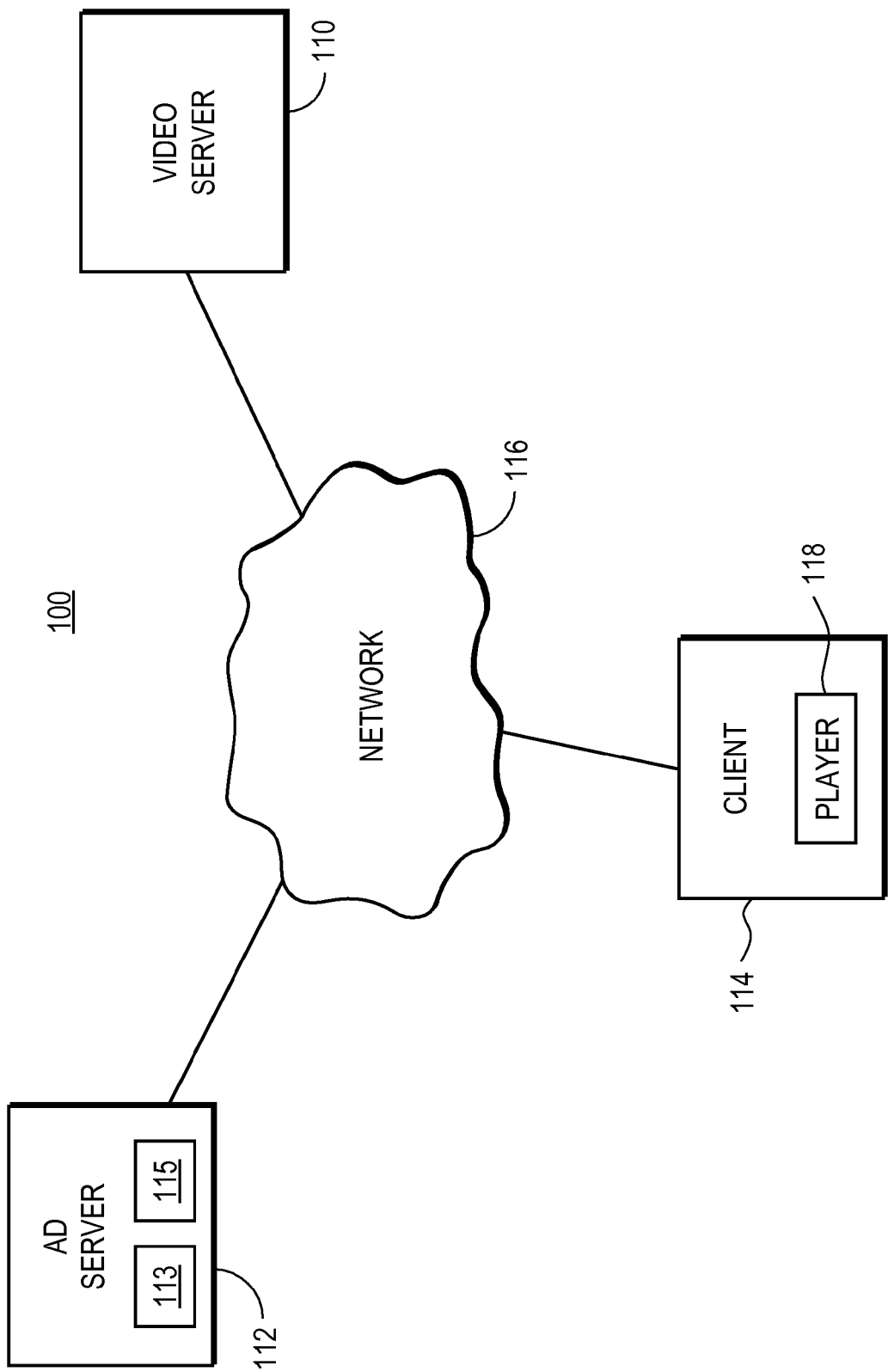
FIG. 1 is a high-level block diagram of a computing environment according to one embodiment.

FIG. 1 is a high-level block diagram of a computing environment 100 according to one embodiment. FIG. 1 illustrates a video server 110, an advertisement server (the "ad server") 112, and a client 114 connected by a network 116. Only one client 114 is shown in FIG. 1 in order to simplify and clarify the description. Embodiments of the computing environment 100 can have thousands or millions of clients 114, as well as multiple video 110 and ad 112 servers connected to the network 116.

The video server 110 provides video content (referred to herein as a "video") to the client 114 via the network 116. In one embodiment, the video server 110 is located at a website provided by YOUTUBE, LLC of San Bruno, Calif., although the video server can also be provided by another entity. The video server 110 includes a database storing multiple videos. A user of a client 114 can browse or search the videos in the database and request one or more videos and/or other content to watch. The video server 110 provides the requested content to the client 114.

The ad server 112 manages and stores advertising content, and also provides the advertising content to the client 114 via the network 116. In some instances, the advertising content is in the same format as the content provided by the video server 110 (e.g., video advertising). In other instances, other types of advertising are presented to the user, such as pure text advertising, advertising providing a hyperlink to an advertiser's website, text-and-audio advertising, and static image advertising. In addition, the ad server 112 can provide multiple types of ad content to a single client 114. In one embodiment, the functions of the ad server 112 are provided by the video server 110.

A unit of advertising content provided by the ad server 112 is referred to as a "creative" 113. The ad server 112 provides a creative 113 to the client 114 in response to a request from the client. For certain types of creatives, the ad server 112 also provides the client 114 with information describing how the creative 113 manifests itself in play. In one embodiment, this information is collected in a file called a "controller" 115.

The client 114 is a computer or other electronic device used by one or more users to perform activities including viewing video content received from the video server 110 and viewing creatives received from the ad server 112. The client 114, for example, can be a personal computer executing a web browser that allows the user to browse the video content available at the video server web site. In other embodiments, the client 112 is a network-capable device other than a computer, such as a personal digital assistant (PDA), a mobile telephone, a pager, a television "set-top box," etc.

When the user requests a video, the video server 110 provides the video to the client 114 via the network 116. At the instruction of the video server 110, a player 118 at the client 114 contacts the ad server 112 and downloads one or more creatives and controller files to the client 114. The player 118 displays the video and creative 113 at the client 114. In one embodiment, the controller file 115 causes the creative 113 to appear as an animated mid-roll overlay over the video. For example, the player 118 displays the creative 113 across the bottom of the area displaying the video 15 seconds after the beginning of the video. Once the creative 113 completes its display, the player 118 minimizes the creative 113 and provides a user interface element allowing the user to replay the creative 113 if desired. The player 118 can also display other creatives, such as a static creative that is associated with the animated creative 113.

The network 116 represents the communication pathways between the video server 110, ad server 112, and clients 114. In one embodiment, the network 116 is the Internet. The network 114 can also utilize dedicated or private communications links that are not necessarily part of the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
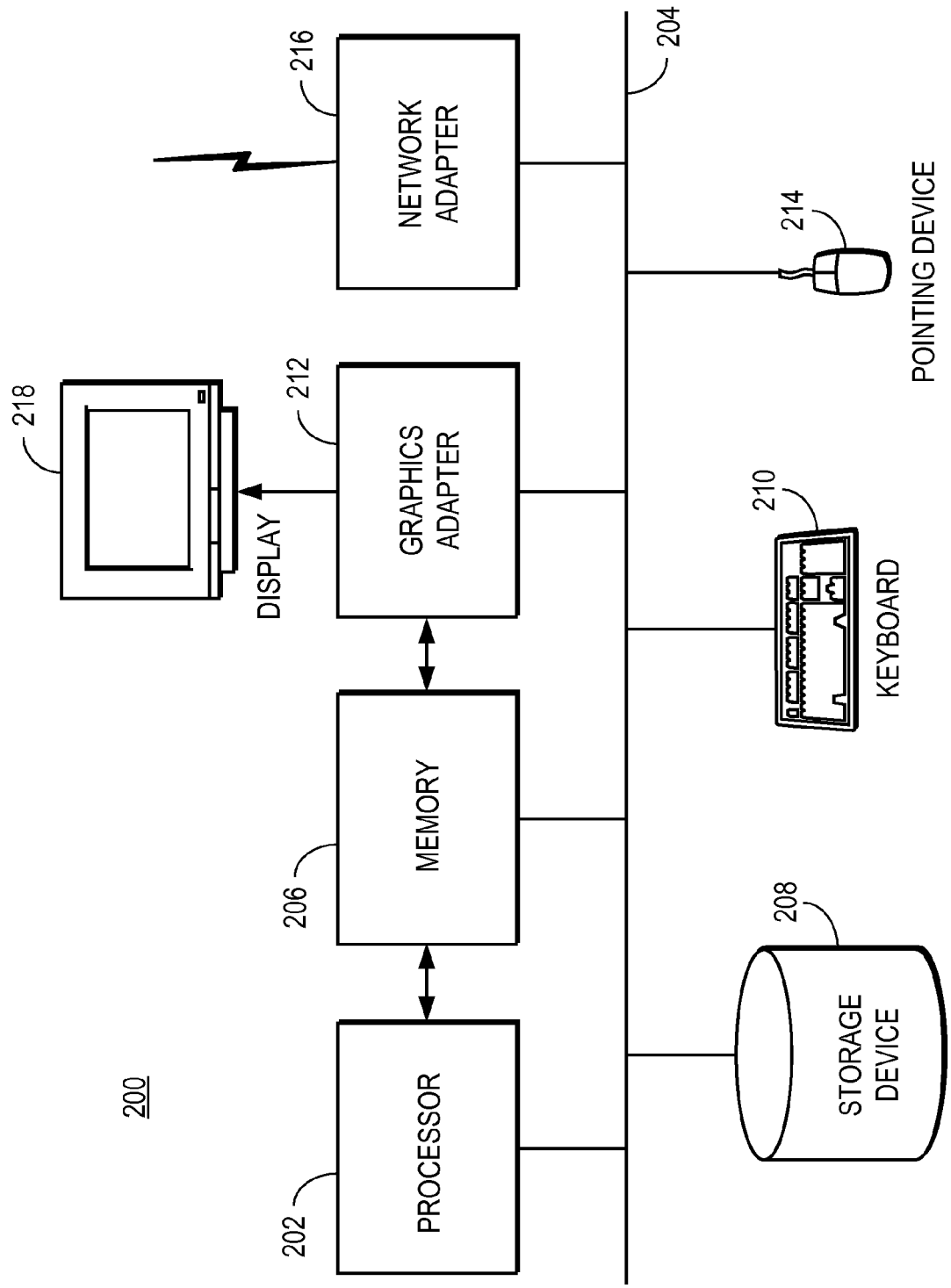
FIG. 2 is a high-level block diagram illustrating an example of a computer for use as a video server, ad server, and/or client.

FIG. 2 is a high-level block diagram illustrating an example of a computer 200 for use as a video server 110, ad server 112, and/or client 114. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 utilized by the entities of FIG. 1 can vary depending upon the embodiment and the processing power utilized by the entity. For example, a client 114 that is a mobile telephone typically has limited processing power, a small display 218, and might lack a pointing device 214. The video server 110, in contrast, may comprise multiple blade servers working together to provide the functionality described herein.

Figure 3:
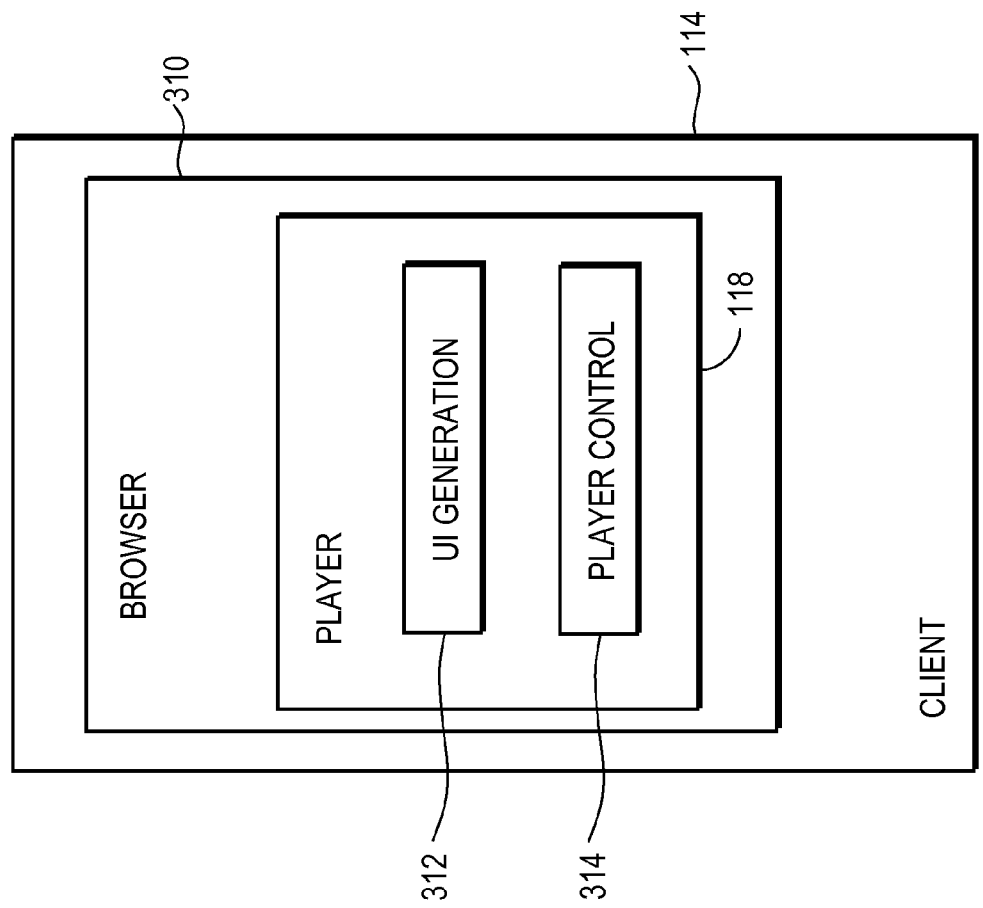
FIG. 3 is a high-level block diagram illustrating a detailed view of modules within the client according to one embodiment.

FIG. 3 is a high-level block diagram illustrating a detailed view of modules within the client 114 according to one embodiment. Some embodiments of the client 114 in accordance with other embodiments have different and/or other modules than the ones described here. Similarly, the functionalities can be distributed among the modules in accordance with other embodiments in a different manner than is described here. Depending upon the embodiment, certain modules can be incorporated into an operating system executing on the client 114 while in other embodiments the modules are standalone applications or parts of other products.

A browser module 310 allows the user of the client to browse the videos available at the video server web site. Depending upon the embodiment, the browser module 310 can be a well-known web browser such as MOZILLA FIREFOX or MICROSOFT INTERNET EXPLORER. As is known in the art, the browser module 310 receives web pages from a web server and displays the web pages on the display 218 associated with the client 114. A web page can include different regions dedicated to displaying different types of content, as well as user interface elements that can be manipulated by the user.

A player module 118 (the "player" described above) plays the video that the client 114 receives from the video server 110 and performs related actions. In one embodiment, the player module 118 is activated by the browser module 118 upon receiving an instruction from the video server 110. In one embodiment, the player module 118 includes a FLASH player from ADOBE SYSTEMS INC. of San Jose, Calif., although other embodiments differ. The player module can be integrated into the browser as, for example, a plug-in or browser helper object. The client 114 can acquire the player module 118 from the video server 110 or another source.

The player module 118 includes a user interface (UI) generation module 312 for creating, displaying, and enabling UI elements providing information to the user and allowing the user to control the player 118. These UI elements appear on the web page displayed by the browser module 310. The user can use the elements to perform actions such as requesting videos, playing the videos, selecting a creative 113 (e.g., clicking on the creative to request more information about the advertised product), and the like.

The player module 118 also includes a player control module 314 for controlling the actions of the player. In one embodiment, the player module 118 provides the controller file 115 for a creative 113 to the player control module 314. The player control module 314 parses the controller file 115 and causes the player 118 to behave in the specified manner. In addition, the player control module 314 causes the UI generation module 312 to generate UI elements based on the controller file 115.

As mentioned above, the controller file 115 controls how a creative 113 manifests itself during play. The controller file 115 can be an XML file that specifies rules defining how the creative 113 is displayed. In one embodiment, the controller file 115 is based on a template provided by the entity that operates the video server 110. The controller file 115 specifies information such as the point during playback of the video content when the creative appears (e.g., an offset time from the beginning of the video at which to display the creative), the duration for which the creative is displayed, the location on the web page of a companion ad (if any), where in the video area to display the creative, characteristics of the creative display (e.g., the level of transparency), and whether the creative is to be displayed on certain types of clients (e.g., whether the creative displays on mobile phone clients). For example, the controller file 115 can specify that the creative 113 is displayed 15 seconds after the start of the associated video content, that the creative is displayed for 10 seconds, and that the creative is displayed along the bottom edge of the area displaying the video. The controller file 115 can also specify that the creative 113 is displayed on a "share and watch" page that appears after the associated video content finishes play.

The controller file 115 can also describe how and when ad reporting events associated with the creative 113 are measured. Thus, the controller file 115 can indicate that an ad impression is recorded when the creative 113 is initially displayed (e.g., when the creative is displayed at the 15 second mark). The controller file 115 can also indicate that a "click to play event" or "click through" event is recorded when the creative 113 is selected by a user. The controller file 115 can also cause the player control module 314 to track how much of the creative 113 is played, such as reporting if the creative completes 25%, 50%, 75%, or 100% of its presentation. In one embodiment, the player control module 314 reports this recorded information to the ad server 112.

In addition, the controller file 115 can specify actions to be performed by the player control module 314 when a creative 113 is selected by a user. In one embodiment, a companion video ad is displayed when the creative 113 is selected. This companion video ad can appear as a picture-in-picture. That is, the companion video ad appears in the same area as the main video, is superimposed over the main video, and is framed within a border that does not cover the entire main video. Further, the main video is paused and faded slightly to indicate that it is background. In one embodiment, if the user selects the companion video, a new browser window is opened that displays a web page associated with the companion video (e.g., with the item being advertised by the companion video and creative). The companion video is removed from the main video, so that the main video is viewable when the user returns to the web page on which it is displayed.

In another embodiment, a rich media interactive ad is displayed when the creative 113 is selected by the user. The main video is paused when the user selects the creative 113, and an interactive ad (or other message) is displayed in approximately the same area as the main video content. The user can interact with the various elements of the interactive ad to view and purchase items. For example, the rich media interactive ad can let the user view different music to buy by shuffling through album covers. If the user selects a particular album, a new browser window opens and displays a web page associated with the selected album. One version of the rich media interactive is not removed from the main video when selected. In other words, the rich media interactive ad remains in the video area until the user uses a UI element to close it. In one embodiment, the functionality of the rich media interactive ad is provided using technology based on FLASH.

Figure 4:
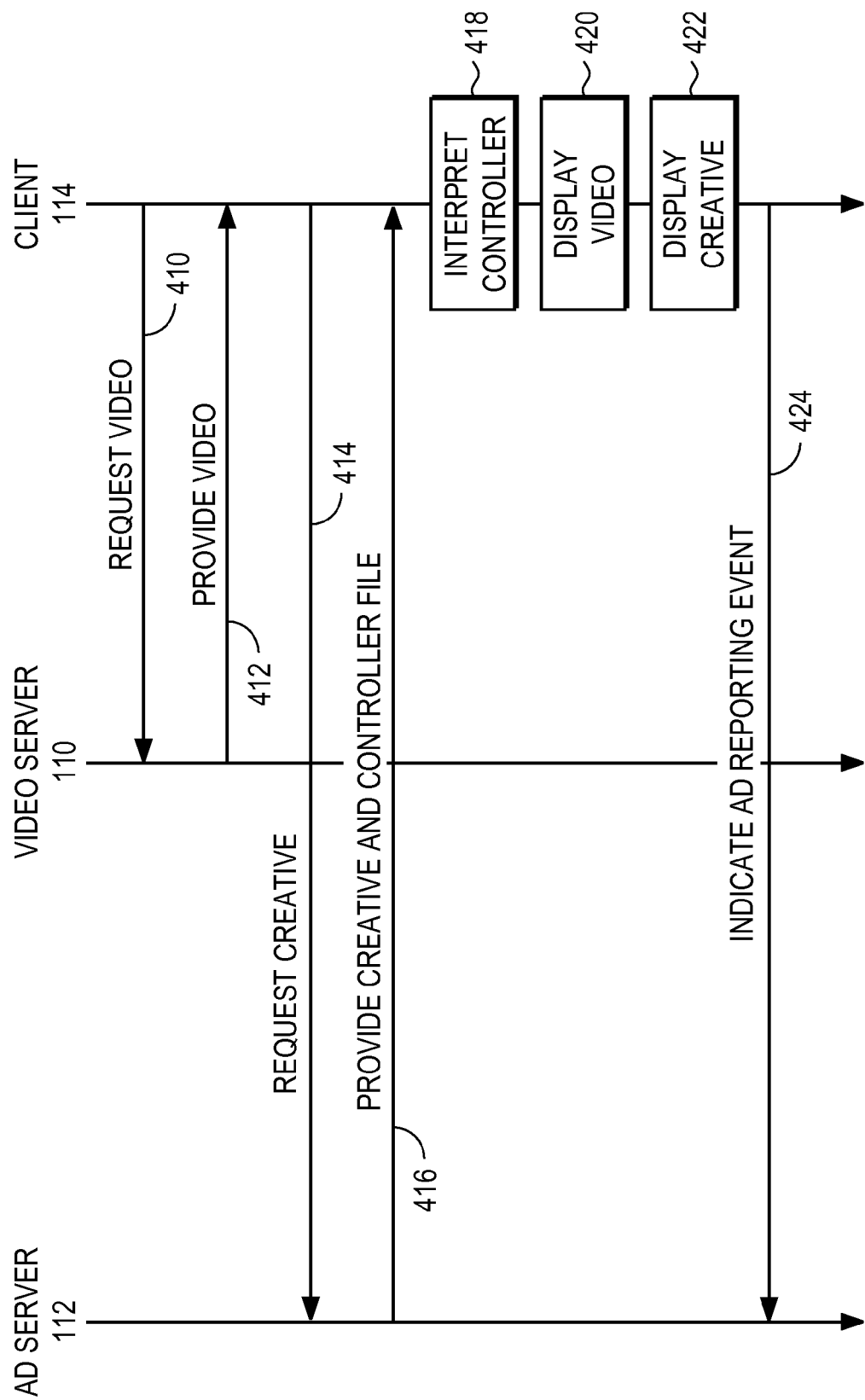
FIG. 4 is a sequence diagram illustrating the steps involved in the displaying of a creative at a client according to one embodiment.

FIG. 4 is a sequence diagram illustrating the steps involved in the displaying of a creative 113 at a client 114 according to one embodiment. In the diagram, three vertical lines respectively represent the ad server 112, the video server 110, and the client 114. Time flows from the top to the bottom of the figure and the horizontal lines between the entities represent communications. Boxes on the lines represent activities performed by the associated entity. Those of skill in the art will recognize that other embodiments can perform the steps of FIG. 4 in different orders. Moreover, other embodiments can include different and/or additional steps and communications than the ones described here. In some embodiments, the video server 110 and the ad server 112 are the same server. In other embodiments, the video 110 and ad 112 servers are controlled by the same entity or are controlled by different entities.

Assume for purposes of this example that a user of the client 114 browses a web site provided by the video server 110 and requests 410 a video. The video server 110 provides 412 the video to the client 114 in response. For example, the video server 110 can stream the video to the client 114. The player 118 at the client 114 requests 414 a creative 113 from the ad server 112. Depending upon the embodiment, this request may include parameters that describe aspects such as an identifier of the requested video, an identifier of the type (e.g., category) of the video, and characteristics of the user of the client 114 (e.g., gender or location) if the user has provided them. The ad server 112 selects one or more creatives, possibly based on the parameters provided in the request, and provides 416 the selected creative 113 and a corresponding controller file 115 to the client 114.

The player 118 at the client 118 interprets 418 the controller file 115 to determine how to manifest the creative 113. Contemporaneously, the player 118 displays 420 the requested video at the client 114. At a time relative to the beginning play of the video, the player 118 displays 422 the creative 113 as specified by the controller file 115. The user can select the creative 113 while it is displayed, and can also perform other actions such as minimizing or restoring it. In one embodiment, the player 118 sends 424 an ad reporting event indicating that an ad impression for the creative 113 occurred.

Figure 5:
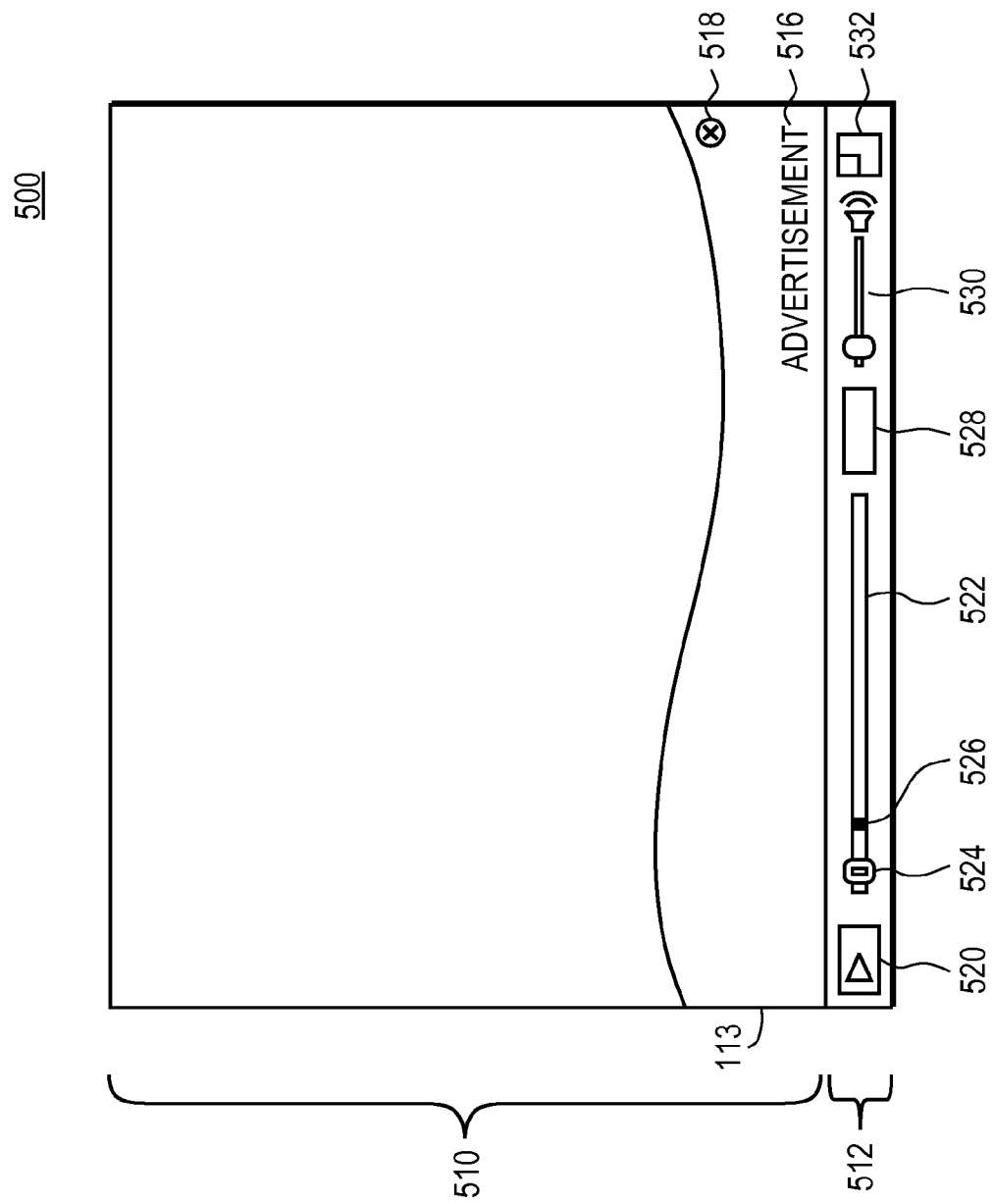
FIG. 5 illustrates a user interface (UI) generated by the player according to one embodiment.

FIG. 5 illustrates a UI 500 generated by the player 118 according to one embodiment. Other embodiment of the UI can differ from the one shown, and elements within the UI can likewise differ.

The UI 500 includes a video area 510 and a control area 512. The video area 510 displays the main video received from the video server 110. FIG. 5 illustrates that the creative 113 is displayed along the bottom edge of the video area 510.

The creative 113 includes text 516 identifying the creative as an advertisement, and also includes a minimize button 518 that allows the user to minimize (i.e., hide) the creative. In one embodiment, the creative 113 is 480 pixels wide and 55 pixels high, and can have some elements that extend up to 70 pixels high. The creative 113 can be animated, and can vary its dimensions as it plays. In addition, the creative 113 can be translucent or partially transparent so that the main video is visible beneath it.

In one embodiment, the player 118 overlays a transparent screen over the creative 113 while it is displayed. The player 118 instantiates UI elements such as the text 516 and minimize button 518 on the transparent screen. In addition, the player 118 uses the transparent screen to mask user actions from reaching the creative 113. The transparent layer thus allows the player 118 to provide a consistent UI across different creatives.

The control area 512 includes UI elements for controlling the playback of the video, and for viewing the status of the playback. A "play" button 520 allows the user to play and pause the video. A progress bar 522 shows the length of the video and a playhead 524 on the progress bar indicates the current position of the video. In one embodiment, an indicator 526 on the progress bar 522 indicates the point at which the creative is displayed. That is, the creative 113 is displayed in the video area 510 when the playhead reaches the indicated position in the progress bar 522. The indicator 526 can be, for example, a distinctly colored line, block, or other visible symbol shown on or adjacent to the progress bar 522 that indicates the offset point from the beginning of the video at which the creative 113 is displayed. In addition, the control area 512 includes a time indicator showing the current time index of the video, a volume control 530 for controlling the volume of any audio associated with the video, and a sizing control 532 for controlling the size of the video window 510.

In one embodiment, the player 118 displays the UI elements associated with the creative 113 in a similar color and/or uses other techniques to indicate that the creative and elements are related. For example, the player 118 can display the text 516, minimize button 518, and indicator 526 in the same color to indicate that these elements are related.

Figure 6A:
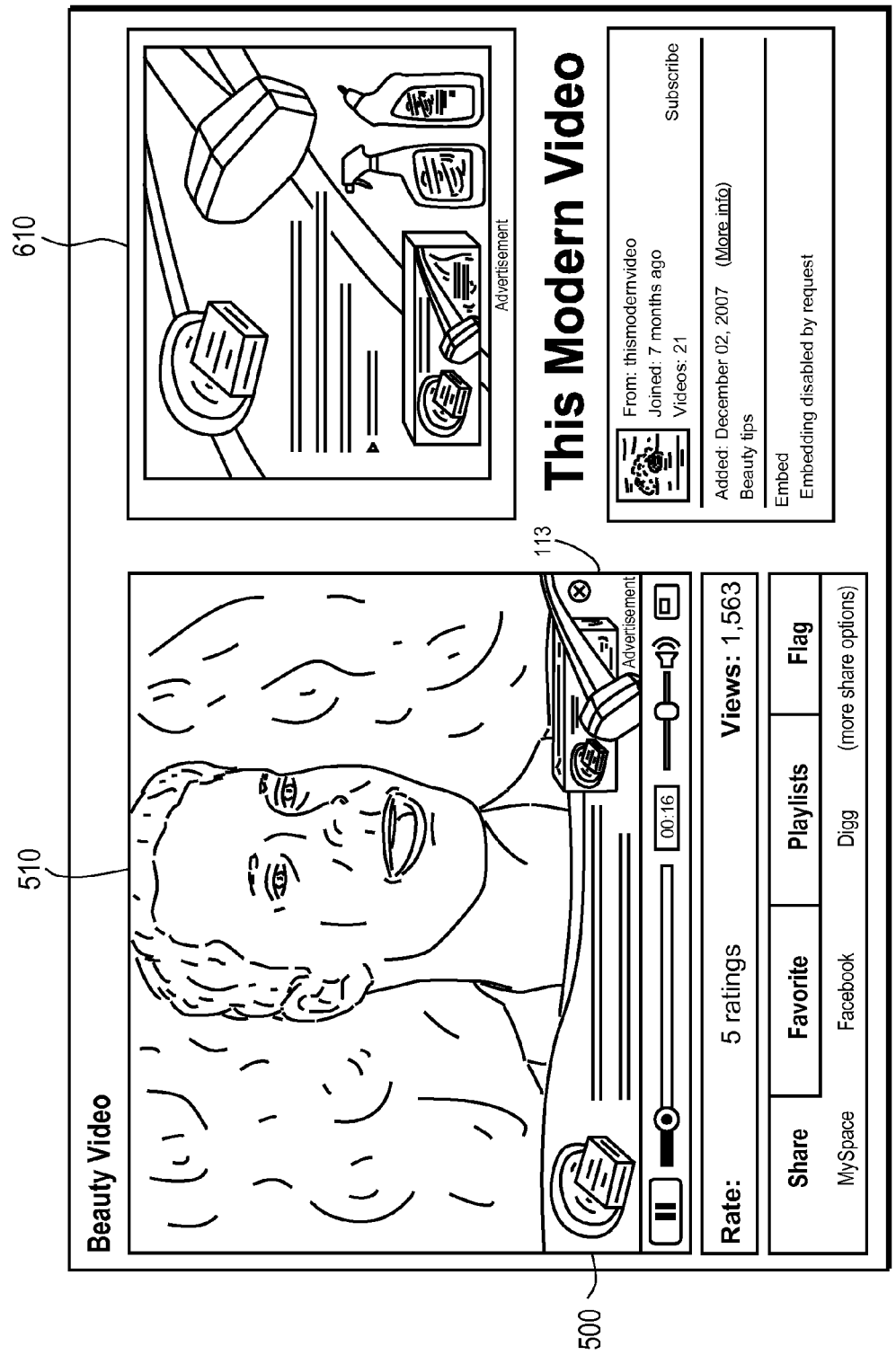
Figure 6C:
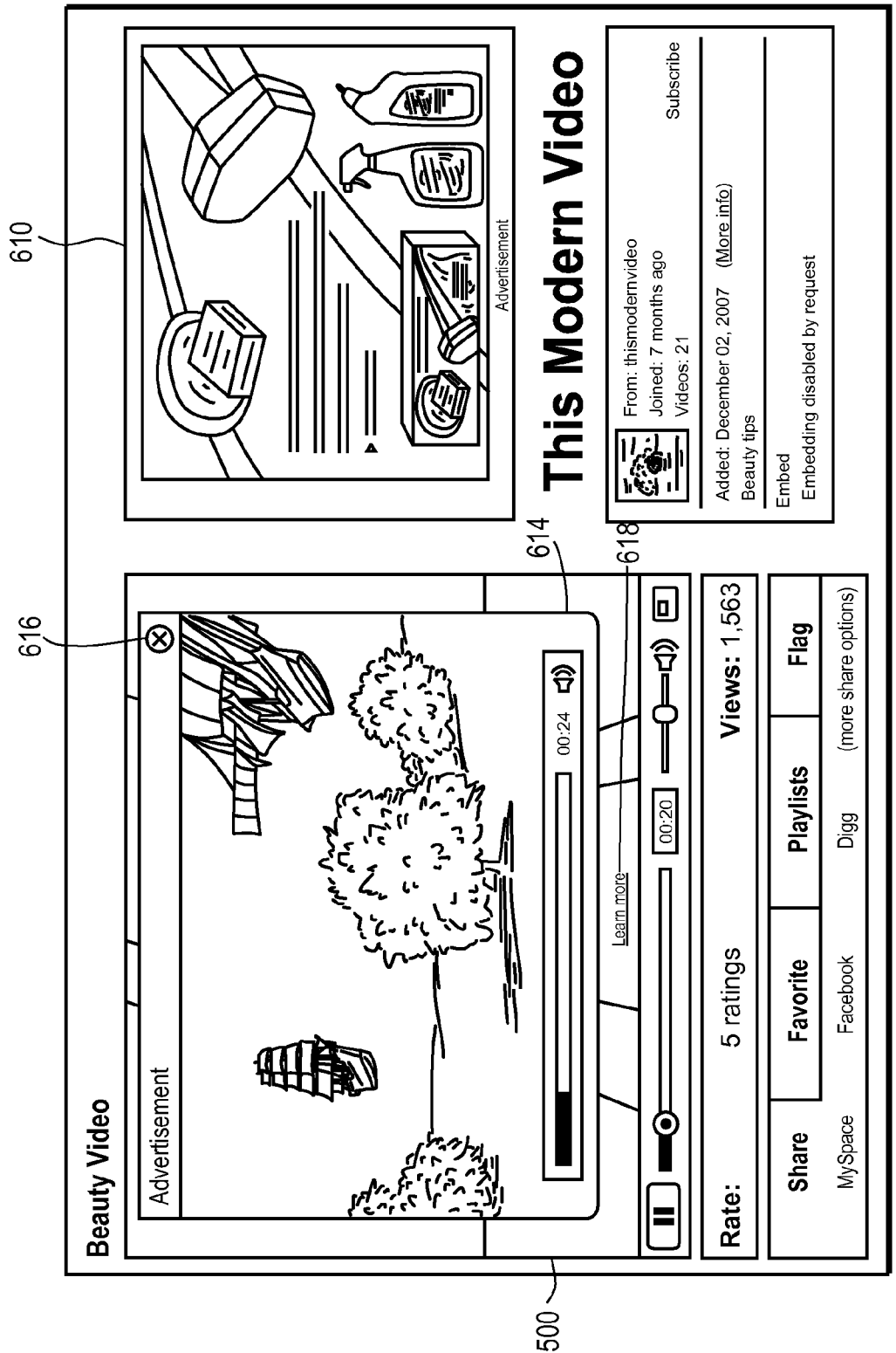

FIGS. 6A, 6B, and 6C illustrate a partial web page 600 including the UI 500 generated by the player and other elements at different stages of operation according to one embodiment. The illustrated web page 600 is an example of a typical web page, and embodiments can have different or additional elements than the ones shown.

The web page 600A of FIG. 6A shows that the video area 510 of the player UI 500 includes a playing video. In addition, the UI 500 includes a creative 113 displayed along the bottom of the video area 510. The web page 600A also includes a companion creative 610 in the form of a static ad that appears to the right of the video area 510. In one embodiment, the companion creative 610 is related to the creative 113 in the video area 510 and can, for example, advertise the same item. The companion creative 610 displays a web page containing information about the advertised item when selected by the user. The companion creative 610 can include the same color scheme or have other characteristics to indicate that it is related to the other creative 113. In other embodiments, the companion creative 610 is of a different form (e.g., is not static) and can be displayed in a different location on the web page 600A.

The web page 600B of FIG. 6B shows the same web page as FIG. 6A, except that the creative 113 is minimized. The creative 113 can be minimized, for example, in response to the user selecting the minimize button 518 shown on the displayed creative. As shown in FIG. 6B, in one embodiment a small "replay" button 612 is displayed in the lower-right corner of the video area 510 while the creative 113 is minimized. The user can select the replay button 612 to replay the creative 113.

The web page 600C of FIG. 6C shows the same web page as FIGS. 6A and 6B. In FIG. 6C a companion video ad 614 is displayed in response to the user selecting the creative 113. As described above and shown in FIG. 6C, the companion video ad 614 is superimposed over the main video, and is framed within a border that only partially covers the main video. Further, the main video is paused and faded slightly to indicate that it is background. The companion video ad 614 also includes a "close" button 616 that the user can select to remove the companion video ad and return to the main video, and a "Learn more" link 618 that the user can select to open a separate web page containing information about the advertised item.

The above description is included to illustrate the operation of the embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method for displaying a creative in association with a video, comprising:
   causing the video to play in a video area of a user interface on a client;
   causing the client to receive a controller file containing information controlling how the creative manifests itself during display of the video and information specifying that an advertising event associated with the creative is reported if the creative is displayed for at least a predefined amount of time;
   causing the client to display the creative in a portion of the video area in accordance with the information in the controller file, the creative overlaid on the playing video;
   causing the client to track an amount of time the creative is displayed; and
   causing the client to report the advertising event responsive at least in part to the tracked amount of time the creative is displayed and the predefined amount of time specified in the controller file.

2. The method of claim 1, wherein the information contained in the controller file causes the creative to display along a bottom portion of the video area.

3. The method of claim 1, wherein the information contained in the controller file causes the creative to display at a predetermined point in time after the video has started playing and while the video continues to play.

4. The method of claim 1, wherein the information contained in the controller file causes the creative to display in a partially-transparent manner so that the playing video remains visible beneath the displayed creative.

5. The method of claim 1, further comprising:
   causing removal of the creative from the video area responsive at least in part to selection of the creative by the user of the client.

6. The method of claim 1, further comprising:
   causing display of a companion video responsive to selection of the creative by the user of the client, the companion video appearing in the video area superimposed over a partial portion of the video, wherein the video is paused and faded during display of the companion video.

7. The method of claim 1, further comprising:
causing display of an interactive advertisement in responsive to selection of the creative by a user of the client, the interactive advertisement appearing in the video area and including functionality allowing the user to purchase an item advertised by the interactive advertisement.

8. The method of claim 1, further comprising:
causing the client to display a companion creative on the client outside of the video area, the companion creative associated with the creative displayed in the portion of the video area.

9. The method of claim 1, wherein the creative comprises an animated advertisement.

10. The method of claim 1, further comprising:
causing the client to display a progress bar illustrating a length of the video and a current playback position of the video; and
causing the client to display an indicator in association with the progress bar indicating a playback position of the video at which the creative is displayed.

11. The method of claim 10, further comprising:
causing display of user interface (UI) elements indicating that the creative and the indicator on the progress bar are related.

12. The method of claim 1, further comprising:
causing a transparent screen to be displayed over the creative in the video area; and
causing user interface (UI) elements associated with the creative to be instantiated on the transparent screen.

13. The method of claim 12, wherein the UI elements comprise one or more elements from the set consisting of:
text indicating that the creative is an advertisement and a control enabling a user to minimize display of the creative.

14. The method of claim 1, wherein the client is caused to report an advertising event responsive at least in part to the tracked amount of time the creative is displayed matching or exceeding the predefined amount of time specified in the controller file.

15. The method of claim 1, wherein the predefined amount of time is specified as a predefined percentage of a presentation of the creative.

16. A computer-readable storage device storing executable computer program instructions for displaying a creative in association with a video, the computer program instructions comprising:
a player module configured to receive a video for displaying in a display area of a client, a creative associated with the video, and a controller file containing information specifying how the creative manifests itself during display of the video and information specifying that an ad reporting event associated with the creative is reported if the creative is displayed for at least a predefined amount of time; and
a player control module configured to receive the controller file, to display the creative in a portion of the display area overlaid on the displayed video in accordance with the controller file, to track an amount of time the creative is displayed, and to report an advertising event responsive at least in part to the tracked amount of time the creative is displayed and the predefined amount of time specified in the controller file.

17. The computer-readable storage device of claim 16, wherein the controller file further specifies one or more instructions from the set consisting of:
a point during playing of the video at which the creative is displayed, a location in the display area at which the creative is displayed, and a length of time for which the creative is displayed.

18. The computer-readable storage device of claim 16, further comprising:
a user interface (UI) generation module configured to generate UI elements in the portion of the display area overlaid on the displayed video content.

19. The computer-readable storage device of claim 18, wherein the UI elements comprise one or more UI elements selected from the set consisting of:
a UI element for minimizing display of the creative and a UI element for redisplaying the creative after display of the creative ends.

20. The computer-readable storage device of claim 16, wherein the controller file specifies actions performed when the creative is selected by a user of the client.

21. The computer-readable storage device of claim 20, wherein the controller file specifies that a companion video advertisement is displayed superimposed over the displayed video content in response to selection of the creative by the user.

22. The computer-readable storage device of claim 20, wherein the controller file specifies that an interactive rich media advertisement is displayed in response to selection of the creative by the user.

23. The computer-readable storage device of claim 16, wherein the player control module is further configured to cause the client to report an advertising event responsive at least in part to the tracked amount of time the creative is displayed matching or exceeding the predefined amount of time specified in the controller file.

24. The computer-readable storage device of claim 16, wherein the predefined amount of time is specified as a predefined percentage of a presentation of the creative.

25. A server for causing a creative to display in association with a video at a client, the server comprising:
a computer-readable storage device storing executable computer program instructions comprising:
instructions configured to cause the client to receive a video for displaying in a display area of the client, a creative associated with the video, and a controller file specifying how the creative manifests during display of the video and information specifying that an ad reporting event associated with the creative is reported if the creative is displayed for at least a predefined amount of time; and
instructions configured to cause the client to display the creative in a portion of the display area overlaid on the displayed video in accordance with the controller file, to track an amount of time the creative is displayed, and to report an advertising event responsive at least in part to the tracked amount of time the creative is displayed and the predefined amount of time specified in the controller file; and
a processor for executing the instructions.

26. The server of claim 25, wherein the controller file further specifies one or more instructions from the set consisting of:
a point during playing of the video at which the creative is displayed, a location in the display area at which the creative is displayed, and a length of time for which the creative is displayed.

27. The server of claim 25, further comprising:
instructions configured to cause the client to generate UI elements in the portion of the display area overlaid on the displayed video content.

28. The server of claim 27, wherein the UI elements comprise one or more UI elements selected from the set consisting of:
a UI element for minimizing display of the creative and a UI element for redisplaying the creative after display of the creative ends.

29. The server of claim 25, wherein the controller file specifies actions performed when the creative is selected by a user of the client.

30. The server of claim 25, further comprising:
instructions configured to cause the client to report an advertising event responsive at least in part to the tracked amount of time the creative is displayed matching or exceeding the predefined amount of time specified in the controller file.

31. The server of claim 25, wherein the predefined amount of time is specified as a predefined percentage of a presentation of the creative.

\* \* \* \* \*

UNITED STATES PATENT AND TRADEMARK OFFICE
CERTIFICATE OF CORRECTION

PATENT NO. : 8,281,332 B2  Page 1 of 1
APPLICATION NO. : 12/111179
DATED : October 2, 2012
INVENTOR(S) : Shivakumar Rajaraman et al.

It is certified that error appears in the above-identified patent and that said Letters Patent is hereby corrected as shown below:

Front Page (75) Assignee: line 3, delete "Shrock" and insert --Schrock--.

Signed and Sealed this
Twenty-sixth Day of February, 2013

Teresa Stanek Rea
*Acting Director of the United States Patent and Trademark Office*